Dec. 10, 1929.   A. L. DAVIS   1,738,871
DIRECTION SIGNAL FOR MOTOR VEHICLES
Filed Oct. 2, 1926
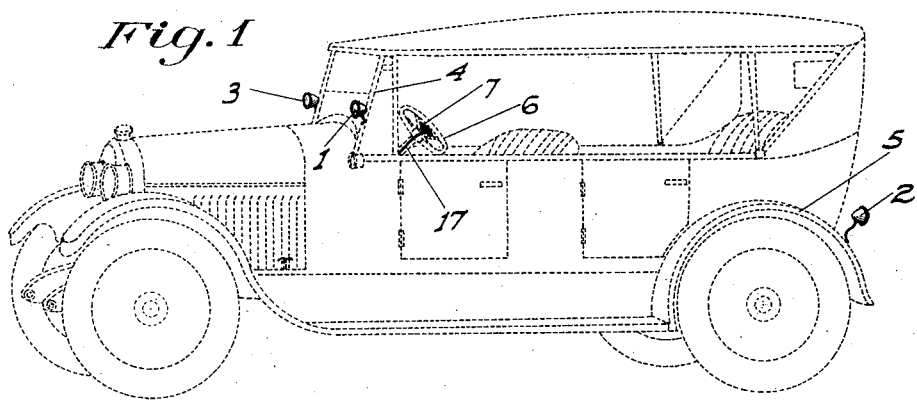
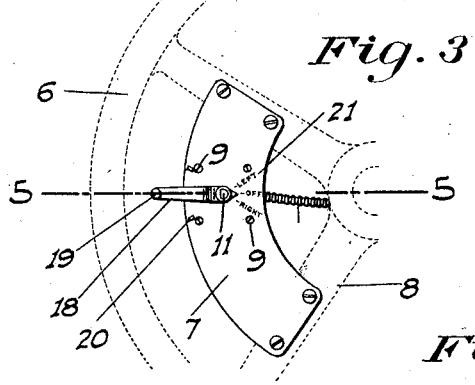
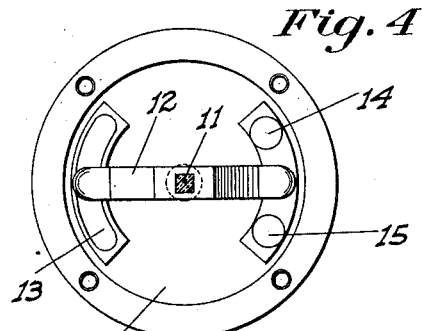
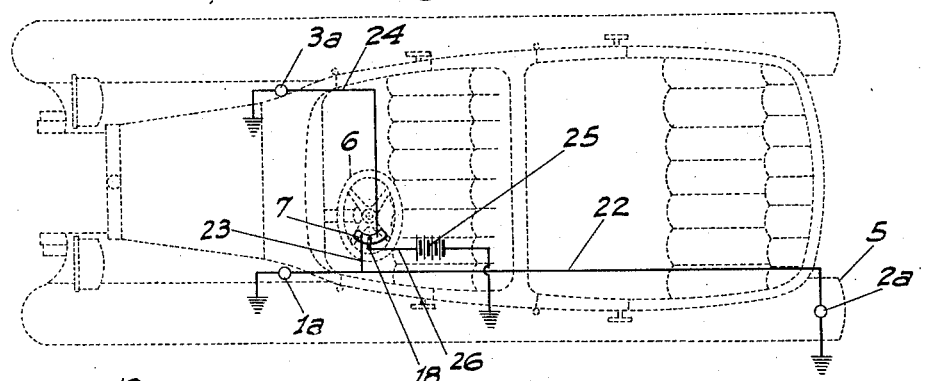
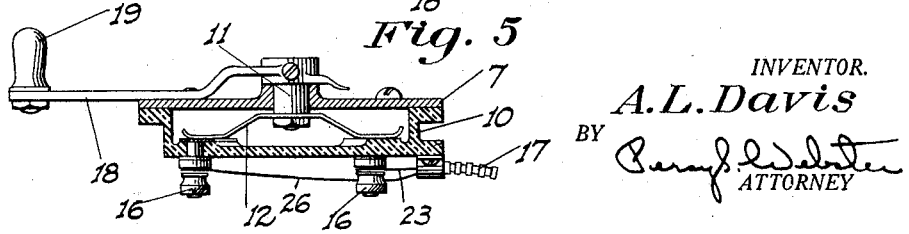
INVENTOR.
A. L. Davis
BY
ATTORNEY Patented Dec. 10, 1929

1,738,871

UNITED STATES PATENT OFFICE

ARTHUR L. DAVIS, OF MODESTO, CALIFORNIA

DIRECTION SIGNAL FOR MOTOR VEHICLES

Application filed October 2, 1926. Serial No. 139,068.

This invention relates to improvements in signaling systems for motor vehicles, my principal object being to provide a hand operated electric signal system of especial use after dark, to supplement hand or other signals now in use, and so arranged that a clear and unmistakable signal is given simultaneously from both the front and rear of the vehicle on the left side thereof to indicate a left turn; and from the front of the vehicle on the right side to indicate a right turn. The use of this arrangement therefore makes night driving much safer than is at present the case by tending to eliminate corner collisions now frequent owing to the inability of one driver or the other to see the hand signals of the respective drivers, or from a misunderstanding of such a signal when seen.

My signal may be operated by the driver at any desired distance before reaching an intersection and it may be displayed continuously until the turn is made so that there will be no possible chance of misunderstanding.

A further object of the invention is to provide control means for the signal so arranged that the driver, when giving any signal, may keep both hands on the wheel while making a turn, as is highly desirable for efficient manipulation of the car.

A further object of the invention is to produce a simple and inexpensive device and yet one which will be exceedingly effective for the purpose for which it is designed.

These objects I accomplish by means of such structure and relative arrangement of parts as will fully appear by a perusal of the following specification and claim.

In the drawings similar characters of reference indicate corresponding parts in the several views:

Fig. 1 is a perspective outline of an automobile showing my preferred arrangement of signal lights thereon.

Fig. 2 is a diagrammatic plan of the automobile showing the wiring arrangement for the signal lights.

Fig. 3 is a fragmentary enlarged outline of a steering wheel showing the preferred location of the control switch thereon.

Fig. 4 is a plan view of the switch box detached.

Fig. 5 is a cross section of the switch mechanism taken on the line 5—5 of Fig. 3.

Referring now more particularly to the characters of reference on the drawings, I preferably employ three signal lights which comprise casings 1, 2, and 3, having electric light bulbs $1^a$, $2^a$, and $3^a$ respectively therein. The casings 1 and 2 are located on the left hand side of the vehicle, the casing 1 facing forwardly and preferably located so as to be visible from the front and to one side of the car (as for instance on the windshield frame 4); while the casing 2 is mounted adjacent the rear end of the car to face rearwardly (as for instance on the rear left hand fender 5). The corresponding lights $1^a$ and $2^a$ (or the lenses of the casings) are both the same color, preferably green.

The casing 3 is located on the right hand side of the car in a location corresponding to that of the casing 1, its bulb or lens being preferably colored yellow or orange.

Mounted on the steering wheel 6 of the car is a switch mechanism to control the lights. This mechanism comprises a plate 7 curved so as to be concentric with the wheel and resting on and secured to adjacent spokes of the wheel on the left hand side.

Disposed under the plate and removably secured thereto by screws 9 is a switch box 10. Turnably mounted in the plate and depending into the box is a spindle 11, the lower end of which carries a diametrically extending spring contact finger 12. One end of this finger engages at all times a contact strip 13 mounted in the box concentric with the spindle, while the other end of the finger is adapted to engage either at a time of a pair of circumferentially spaced contacts 14 and 15. The box 10 and the stem 11 are of insulation material so that all contacts will be insulated from each other. Binding posts 16 are connected to the strip 13 and the contacts 14 and 15, the wires from said posts leading into a tubular housing 17, one end of which is connected to the switch box, and extends thence downwardly along the steering column or elsewhere as may be desired.

Projecting radially from the upper end of the spindle toward the adjacent rim of the steering wheel is a handle lever 18, fixed on said spindle. The outer end of this lever has a knob 19 or the like, so that the lever may be engaged and moved either way by the thumb or finger of the left hand of the driver grasping the steering wheel. Stops 20 on the plate 7 limit the arcuate movement of the lever, the plate being also preferably marked as at 21 to indicate the position of the handle for the different signals.

Assuming that the one wire and ground system is used, as is common in automotive practice, a wire 22 would extend between the lights $1^a$ and $2^a$ with a branch 23 to the contact 14, while a wire 24 from the light $3^a$ would connect directly with the contact 15. The other terminals of the lights are rounded as is usual. The strip 13 is connected to the battery 25 of the car by a wire 26. It will therefore be seen that depending in which direction the switch handle is turned, either the light $3^a$ or the lights $1^a$ and $2^a$ together would be illuminated and a corresponding signal given. There being two lights for a left hand turn the signal is visible both from front and rear, as is necessary for safe operation. No rear light is necessary with a right hand turn signal however, since no driver attempts to pass another car on the right hand side of the car, and hence a right turn never interferes with the movement of a vehicle approaching from behind.

The switch handle being located near the rim of the steering wheel and convenient to the normal position of the hand thereon, it can be manipulated by such hand without removing the same from the steering wheel.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claim.

Having thus described my invention what I claim as new and useful and desire to secure by Letters Patent is:

A switch for the purpose described comprising a plate to be mounted on the spokes of a steering wheel, a handle turnably mounted through the plate, a switch blade fixed to the handle, a switch box independent of said plate, handle and switch blade and removably mounted on the plate, contact points within the box, the switch blade being capable of being brought into yielding contact with the contact points when the box is mounted on the plate.

In testimony whereof I affix my signature.

ARTHUR L. DAVIS.